UNITED STATES PATENT OFFICE.

PAUL SCHUTZENBERGER AND FELIX DE LALANDE, OF PARIS, FRANCE.

IMPROVEMENT IN THE PREPARATION OF INDIGO FOR DYEING AND PRINTING.

Specification forming part of Letters Patent No. 136,770, dated March 11, 1873.

*To all whom it may concern:*

Be it known that we, PAUL SCHUTZENBERGER and FELIX DE LALANDE, of the city of Paris, in the Republic of France, have invented new Improvements in Employing Certain Preparations of Indigo in Printing and Dyeing; and we do hereby declare the following to be a full, clear, and exact description of the same:

Our new processes are based on the employment of the hydrosulphites. We thus name the bodies or substances which result from the action of the bisulphites on the metals, as zinc and iron. We especially use the hydrosulphite of soda; and this substance or body is obtained by the action of the bisulphite of soda on zinc, which is the most suitable metal. The hydrosulphites have the property of reducing very rapidly, in the presence of alkalies or alkaline substances, blue indigo to the state of white indigo, and therefore allow the latter to dissolve the said indigo.

Preparation of the Hydrosulphite of Soda.

A vessel which can be completely closed is employed, and this is filled with zinc in grains, shavings from the lathe, or slips arranged so as to present a large surface, and a solution of bisulphite of soda is poured into this vessel, which is afterward closed. The reaction takes place in a medium temperature, or by means of gentle warmth, and is finished in about an hour. The liquid thus obtained, which we name hydrosulphite of soda, is complex, and contains, besides the reductive or hydrogenizing part which constitutes the hydrosulphite of soda, several salts of zinc and soda. The bisulphite of soda to be employed must be well saturated with sulphurous acid. It may be readily obtained with a density from 1.25 to 1.35. With regard to the zinc which is used in the preparation, a small quantity alone of this metal is dissolved. The portion which remains may be used, after cleaning, for the following operation. It is advantageous to employ the hydrosulphite of soda a short time after its preparation; should the salts of zinc contained in the hydrosulphite of soda prepared as above described be prejudicial, they may be precipitated by hydrated lime, alkaline carbonates, or sulphides, or any suitable matters. The liquid is decanted or separated by filtering or pressing out into a cloth. This operation must be performed by exposing the liquid as little as possible to contact with the air. The liquid thus obtained preserves its properties longer than the hydrosulphite of soda which has not undergone this process.

We preferably employ cream of lime for precipitating the salts of zinc.

Employment of the Hydrosulphites for Dyeing by Means of Indigo.

The indigo vat, or solution of indigo for dyeing, may be obtained cold or warm. We obtain the reduction and the solution of the indigo by mixing as follows: Crushed indigo, one part; water, any quantity; caustic soda, at the density of 1.33, three to four parts; concentrated hydrosulphite of soda, three to five parts, according to its reductive power.

After some minutes, and often without heating, the reduction is completed and the indigo is dissolved.

When the hydrosulphite of soda is employed with the lime or an alkaline substance as the carbonates, sulphides, or other similar substance, it may be useful to heat the mixture slightly below boiling heat, in order to obtain an easier, more rapid, and complete reduction.

By employing hydrosulphite of soda deprived of the precipitate produced by alkalies or alkaline substance, as before described, we form a vat of indigo which only contains, in an insoluble state, the impurities or earthy substances contained in indigo. For example, the hydrosulphite of soda will be treated by a cream of lime employed in excess, and the clear part will serve to reduce the indigo with a quantity of quicklime about equal to the third of the weight of indigo. This we heat without boiling.

By operating according to any of the above-mentioned methods we obtain a vat of highly-concentrated dissolution of indigo. In the dyeing-vat, containing a sufficient quantity of water, we add a part of the concentrated indigo-vat, in order to obtain a dyeing-vat at a suitable degree of concentration. The dyeing is effected cold or at a medium temperature, according to circumstances, in the conditions which are generally used in dyeing with the actual vats.

It is useful to employ a certain quantity of hydrosulphite of soda, such as there should be constantly during the operation in excess a reductive agent. When the vat is not sufficiently concentrated there may be added a part of the concentrated vat in order to maintain a suitable concentration.

*Employment of the Hydrosulphites for Printing with Indigo.*

The concentrated vat is made with hydrosulphite of soda, the preparation of which has been described above, by means of any thickening substance, such as gum arabic or other similar matter, and it may be useful to add to it a variable quantity of hydrosulphite of soda (for instance one-third or one-quarter the weight of the color) deprived by the lime of the salt of zinc. The mixture thus prepared is used cold or lukewarm for the printing. The color is fixed by a single oxidation, produced by exposure to the air or to running water, or by the means of some oxidizing body. Then the tissue is washed, soaped, and dressed.

We may likewise, in order to prepare the printing color, make a mixture in suitable proportions—first, of the white or reduced indigo, with the help of hydrosulphite of soda precipitated by means of an acid; second, of an alkali; third, of hydrosulphite of soda; and, fourth, of a thickening substance.

We claim as our invention—

1. The employment of the hydrosulphite of soda or its chemical equivalent in the reduction of the coloring matter of indigo, substantially as described.

2. The mode of treating or reducing indigo by means of the hydrosulphite of soda, or its chemical equivalent, in the presence of an alkali, substantially as described.

In testimony whereof we have signed our names to this specification before two subscribing witnesses.

P. SCHUTZENBERGER.
    F. DE LALANDE.

Witnesses:
 JULES ARMENGAUD, *Fils.*
 LOUIS DARNANVILLE.